(12) United States Patent
Puolitaival et al.

(10) Patent No.: US 9,152,840 B2
(45) Date of Patent: Oct. 6, 2015

(54) METHOD AND PROGRAM OF CONTROLLING ELECTRONIC DEVICE, ELECTRONIC DEVICE AND SUBSCRIBER EQUIPMENT

(75) Inventors: Seppo Puolitaival, Oulunsalo (FI); Pauli Tikkanen, Liminka (FI)

(73) Assignee: Nokia Technologies Oy, Espoo (FI)

( * ) Notice: Subject to any disclaimer, the term of this patent is extended or adjusted under 35 U.S.C. 154(b) by 1576 days.

(21) Appl. No.: 11/922,647

(22) PCT Filed: Jun. 23, 2005

(86) PCT No.: PCT/FI2005/050235
§ 371 (c)(1),
(2), (4) Date: Dec. 20, 2007

(87) PCT Pub. No.: WO2006/136644
PCT Pub. Date: Dec. 28, 2006

(65) Prior Publication Data
US 2009/0243790 A1    Oct. 1, 2009

(51) Int. Cl.
*G05B 19/00* (2006.01)
*G06K 9/00* (2006.01)
*G06F 1/16* (2006.01)
(Continued)

(52) U.S. Cl.
CPC ............ *G06K 9/0002* (2013.01); *G06F 1/1626* (2013.01); *G06F 1/1684* (2013.01); *G06F 1/1698* (2013.01); *G06F 3/03547* (2013.01); *G06F 3/041* (2013.01); *G06F 3/0488* (2013.01);
(Continued)

(58) Field of Classification Search
CPC ... G06F 1/1626; G06F 1/1684; G06F 1/1698; G06F 3/03547; G06F 3/0488; G06F 3/041; G06F 2203/0338; G06F 2203/04806; G06F 3/017; G06F 3/0304; G06F 3/0412; G06F 3/0416; G06F 3/042; G06F 3/0421; G06F 3/044; G06F 3/045; G06F 3/048; G06F 3/0484; G06F 3/04845; G06F 3/0487; G06F 2203/04805; G06K 9/0002; G06K 9/00013
USPC ........ 340/5.1, 500, 501, 5.51–5.53, 5.55, 5.8, 340/5.81–5.83; 341/20–35; 345/156, 345/173–178; 382/124–127
See application file for complete search history.

(56) References Cited

U.S. PATENT DOCUMENTS 4,511,781 A    4/1985  Tucker et al.
5,764,179 A    6/1998  Tsurumoto
(Continued)

FOREIGN PATENT DOCUMENTS

DE    19920162    11/2000
EP    1 437 677    7/2004
(Continued)

OTHER PUBLICATIONS

Office Action dated Jun. 1, 2011 from EP Application No. 10173362. 4, 5 pages.

*Primary Examiner* — Steven Lim
*Assistant Examiner* — Ryan Sherwin
(74) *Attorney, Agent, or Firm* — Alston & Bird LLP

(57) ABSTRACT

Controlling the scaling of a user perceivable output quantity of an electronic device having a sensor for detecting characteristics of a user can be performed as a function of a rotational movement of characteristics of a user detected by the sensor. Alternatively, controlling can be performed as a function of time spent for the detection of the characteristics of a user.

17 Claims, 5 Drawing Sheets

Figure 1:
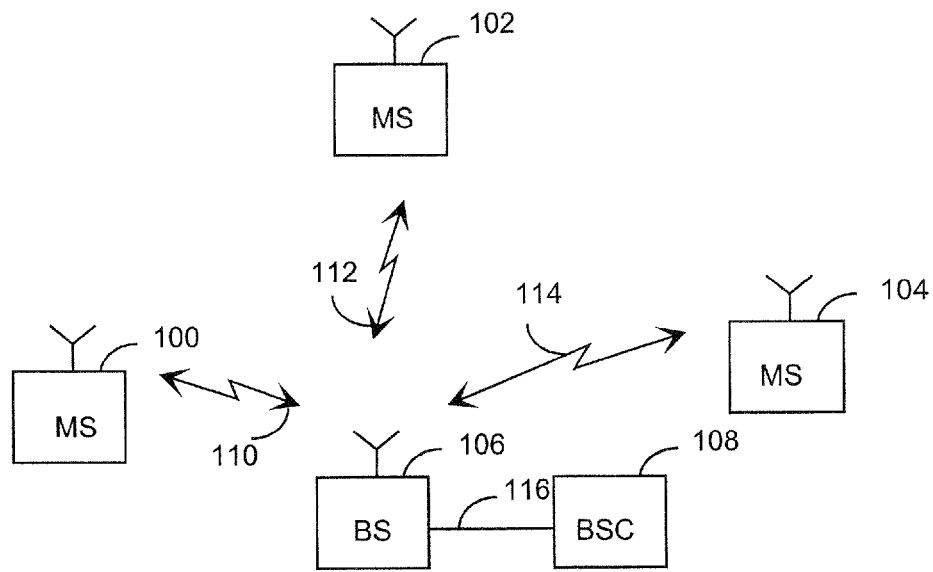

(51) Int. Cl.
*G06F 3/0354* (2013.01)
*G06F 3/041* (2006.01)
*G06F 3/0488* (2013.01)

(52) U.S. Cl.
CPC .... *G06K 9/00013* (2013.01); *G06F 2203/0338* (2013.01); *G06F 2203/04806* (2013.01)

(56) References Cited

U.S. PATENT DOCUMENTS

| | | | |
|---|---|---|---|
| 5,825,352 A * | 10/1998 | Bisset et al. | 345/173 |
| 5,903,229 A * | 5/1999 | Kishi | 341/20 |
| 5,991,431 A * | 11/1999 | Borza et al. | 382/127 |
| 6,057,540 A | 5/2000 | Gordon et al. | |
| 6,282,303 B1 * | 8/2001 | Brownlee | 382/124 |
| 6,677,929 B2 * | 1/2004 | Gordon et al. | 345/156 |
| 6,943,778 B1 * | 9/2005 | Astala et al. | 345/173 |
| 7,054,470 B2 * | 5/2006 | Bolle et al. | 382/124 |
| 7,233,685 B2 * | 6/2007 | Miyasaka et al. | 382/124 |
| 7,406,331 B2 * | 7/2008 | Middleton | 455/556.1 |
| 7,450,111 B2 * | 11/2008 | Hietala et al. | 345/173 |
| 2003/0035568 A1 * | 2/2003 | Mitev et al. | 382/124 |
| 2003/0048262 A1 * | 3/2003 | Wu et al. | 345/173 |
| 2003/0076301 A1 * | 4/2003 | Tsuk et al. | 345/159 |
| 2003/0095096 A1 * | 5/2003 | Robbin et al. | 345/156 |
| 2005/0041885 A1 | 2/2005 | Russo | |
| 2005/0052425 A1 * | 3/2005 | Zadesky et al. | 345/173 |
| 2006/0028454 A1 * | 2/2006 | Branton et al. | 345/173 |
| 2010/0188268 A1 * | 7/2010 | Grignani et al. | 341/22 |

FOREIGN PATENT DOCUMENTS

| | | |
|---|---|---|
| WO | WO 2004/053823 | 6/2004 |
| WO | WO 2004/055717 | 7/2004 |
| WO | WO 2005/022458 | 3/2005 |

\* cited by examiner

METHOD AND PROGRAM OF CONTROLLING ELECTRONIC DEVICE, ELECTRONIC DEVICE AND SUBSCRIBER EQUIPMENT

FIELD

The invention relates to a method and a computer program of controlling an electronic device. The invention also relates to an electronic device and subscriber equipment.

BACKGROUND

An electronic device provides a user with at least one user perceivable output quantity, which may be visible, audible or tactile. For example, volume control may change an audible output quantity, i.e. the amplification of voice or sound may increase or decrease.

The volume control of an audible quantity may be performed using a button, a joystick, a mouse or determined keys in the keyboard.

Fingerprint sensors may also be used for controlling the audible output quantity of the electronic device. There is a plurality of sensor types for detecting a fingerprint. The sensors may comprise an array or a matrix of pixels as a detector in order to form a digital image of the fingerprint. The fingerprint sensors may form an image of a fingertip by, for example, an optical measurement, a thermal measurement, a capacitance measurement, an electric field measurement, a conductance measurement or a pressure measurement.

Volume of sound or voice of the electronic device may be made louder or quieter by a linear movement of a finger over the fingerprint sensor. The linear movement can be a direct up or down motion of a finger over the sensor. For instance, an upward motion of a finger may mean a louder volume and a downward movement of a finger may mean that the volume is to be turned down.

There are, however, problems related to these kinds of controls of the user perceivable output quantity. As the electronic devices are getting smaller and smaller, a separate interface, like a button, a joystick, a mouse or a keyboard, is not desirable. Additionally, moving parts wear and make interfaces unreliable. Sweeping a finger over the sensor, in turn, is not always user friendly and easily usable.

BRIEF DESCRIPTION OF THE INVENTION

An object of the invention is to provide an improved method, computer program, electronic device and subscriber equipment. According to an aspect of the invention, there is provided a method of controlling an electronic device having a sensor for detecting characteristics of a user. The method comprising detecting rotational movement of the characteristics of a user around a normal of a surface of a sensor detecting characteristics of a user; and controlling scaling of a user perceivable output quantity of the electronic device as a function of the rotational movement detected by the sensor.

According to another aspect of the invention, there is provided a method of controlling an electronic device having a sensor for detecting characteristics of a user. The method comprising receiving characteristics of a user by a sensor for detecting characteristics of a user; determining a length of time for receiving the characteristics of a user; and controlling scaling of the user perceivable output quantity of the electronic device as a function of the time for receiving the characteristics of the user.

According to another aspect of the invention, there is provided an electronic device including a sensor for detecting characteristics of a user, at least one component configured to output a user perceivable output quantity, a controller configured to receive detection information from the sensor and to control the at least one component. The sensor is configured to detect rotational movement of the characteristics of a user around a normal of a surface of the sensor; and the controller is configured to control scaling of the user perceivable output quantity of the at least one component as a function of the rotational movement detected by the sensor.

According to another aspect of the invention, there is provided an electronic device including a sensor for detecting characteristics of a user, at least one component configured to output a user perceivable output quantity, a controller configured to receive detection information from the sensor and to control the at least one component. The controller is configured to determine a length of time for receiving the characteristics of a user by the sensor; and control scaling of the user perceivable output quantity of the component as a function of the time for receiving the characteristics of a user.

According to another aspect of the invention, there is provided subscriber equipment of a radio system including a sensor for detecting characteristics of a user, at least one component configured to output a user perceivable output quantity, a controller configured to receive detection information from the sensor and to control the at least one component. The sensor is configured to detect rotational movement of the characteristics of a user around a normal of a surface of the sensor; and the controller is configured to control scaling of the user perceivable output quantity of the at least one component as a function of the rotational movement detected by the sensor.

According to another aspect of the invention, there is provided subscriber equipment of a radio system including a sensor for detecting characteristics of a user, at least one component configured to output a user perceivable output quantity, a controller configured to receive detection information from the sensor and to control the at least one component. The controller is configured to determine a length of time for receiving the characteristics of a user by the sensor; and control scaling of the user perceivable output quantity of the component as a function of the time for receiving the characteristics of a user.

According to another aspect of the invention, there is provided an electronic device including sensing means for detecting characteristics of a user, at least one output means for outputting a user perceivable output quantity, controlling means for receiving detection information from the sensor and for controlling the at least one output means. The sensing means is configured to detect rotational movement of the characteristics of a user around a normal of a surface of the sensor; and the controlling means is configured to control scaling of the user perceivable output quantity of the at least one component as a function of the rotational movement detected by the sensor.

According to another aspect of the invention, there is provided an electronic device including sensing means for detecting characteristics of a user, at least one output means for outputting a user perceivable output quantity, controlling means for receiving detection information from the sensor and for controlling the at least one output means. The controlling means is configured to determine a length of time for receiving the characteristics of a user by the sensor; and control scaling of the user perceivable output quantity of the component as a function of the time for receiving the characteristics of a user.

According to another aspect of the invention, there is provided a computer program product encoding a computer program of instructions for executing a computer process for controlling an electronic device having a sensor for detecting characteristics of a user. The process comprises detecting rotational movement of the characteristics of a user around a normal of a surface of a sensor detecting characteristics of a user; and controlling scaling of a user perceivable output quantity of the electronic device as a function of the rotational movement detected by the sensor.

According to another aspect of the invention, there is provided a computer program product encoding a computer program of instructions for executing a computer process for controlling an electronic device having a sensor for detecting characteristics of a user. The process comprises receiving characteristics of a user by a sensor for detecting characteristics of a user; determining a length of time for receiving the characteristics of a user; and controlling scaling of the user perceivable output quantity of the electronic device as a function of the time for receiving the characteristics of a user.

According to another aspect of the invention, there is provided a computer program distribution medium readable by a computer and encoding a computer program of instructions for executing a computer process for controlling an electronic device having a sensor for detecting characteristics of a user. The process comprises detecting rotational movement of the characteristics of a user around a normal of a surface of a sensor detecting characteristics of a user; and controlling scaling of a user perceivable output quantity of the electronic device as a function of the rotational movement detected by the sensor.

According to another aspect of the invention, there is provided a computer program distribution medium readable by a computer and encoding a computer program of instructions for executing a computer process for controlling an electronic device having a sensor for detecting characteristics of a user. The process comprises receiving characteristics of a user by a sensor for detecting characteristics of a user; determining a length of time for receiving the characteristics of a user; and controlling scaling of the user perceivable output quantity of the electronic device as a function of the time for receiving the characteristics of a user.

The invention provides several advantages. The adjustment of various user perceivable quantities can be carried out in a natural and convenient fashion.

LIST OF DRAWINGS

Figure 2:
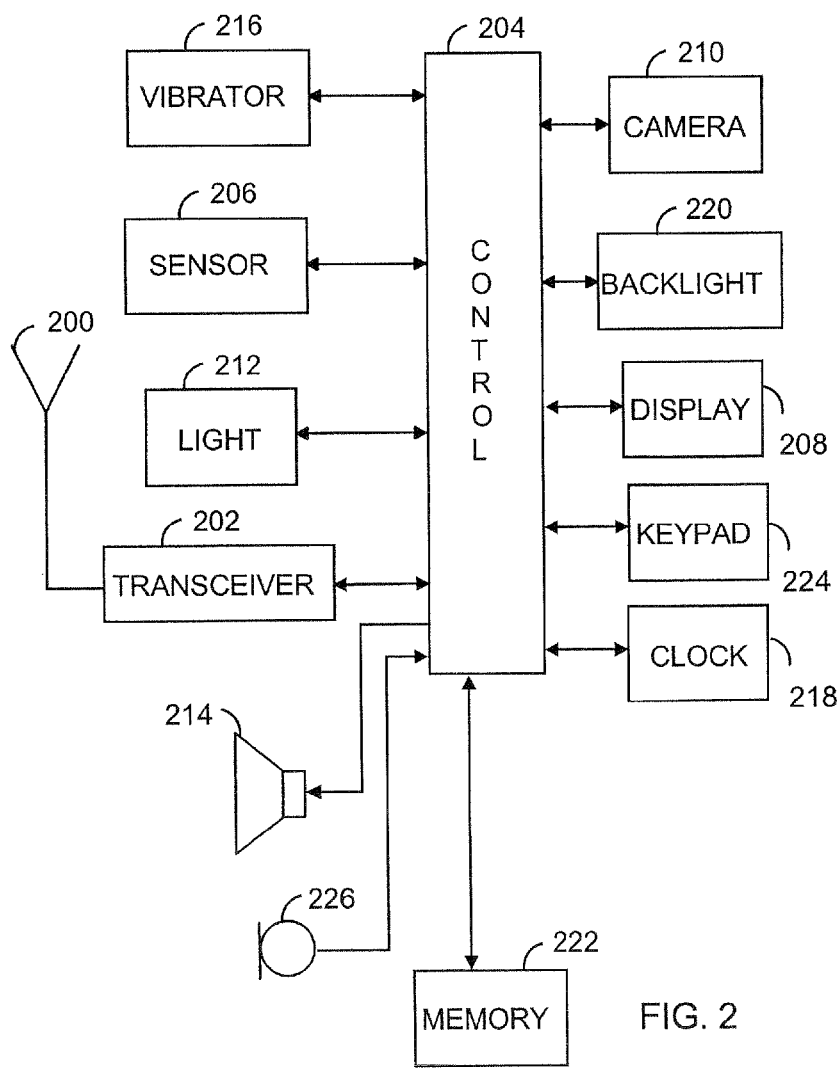
Figure 3A:
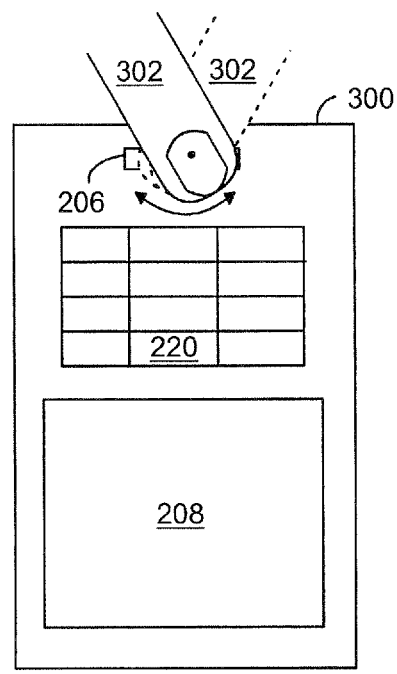
Figure 3B:
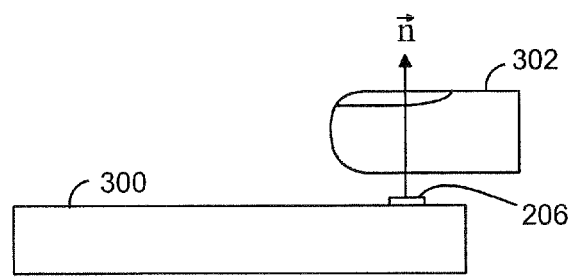
Figure 4:
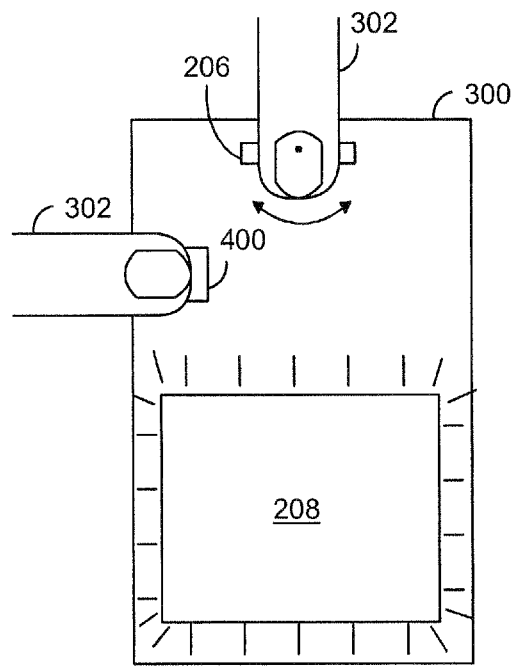
Figure 5:
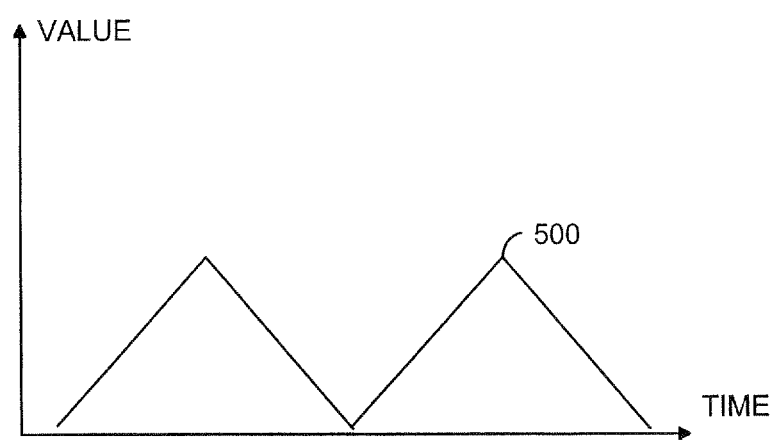
Figure 6:
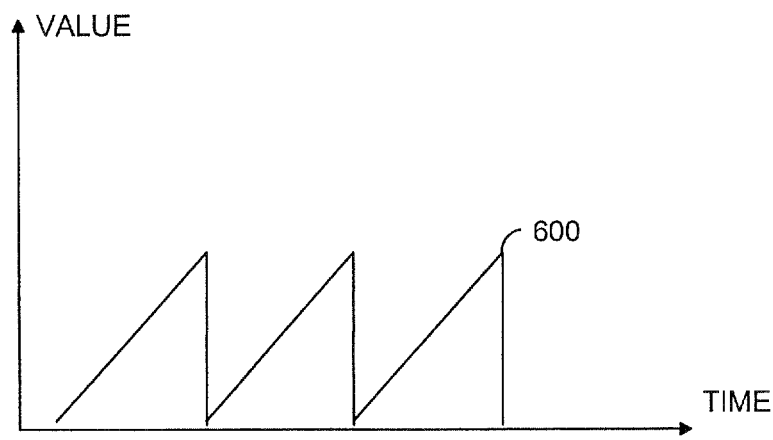
Figure 7:
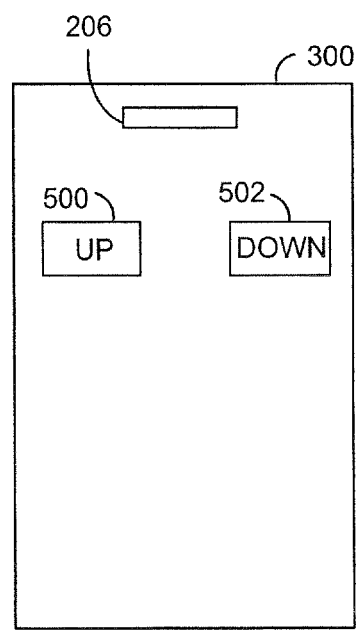
Figure 8:
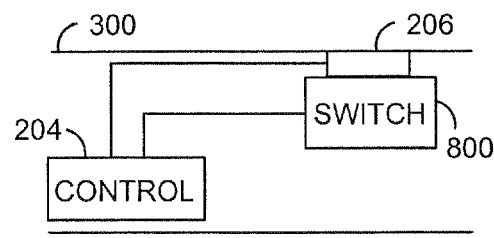
Figure 9:
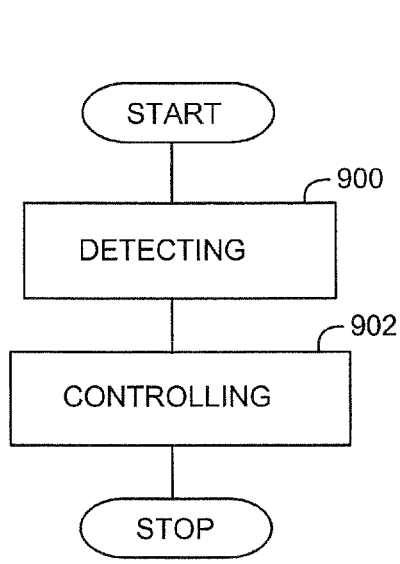
Figure 10:
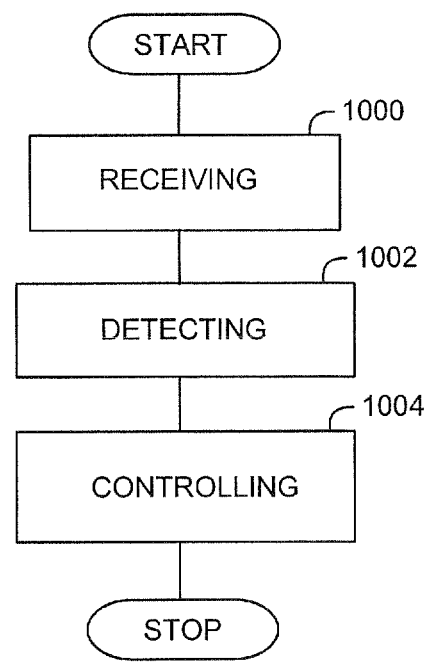

In the following, the invention will be described in greater detail with reference to the embodiments and the accompanying drawings, in which FIG. 1 shows a radio system, FIG. 2 illustrates a subscriber terminal, FIG. 3A illustrates the use of a fingerprint sensor, FIG. 3B illustrates the use of the fingerprint sensor seen from the side, FIG. 4 illustrates the use of the fingerprint sensor with a leading key, FIG. 5 illustrates a behavior of user perceivable output quantity as a function of time, FIG. 6 illustrates a behavior of user perceivable output quantity as a function of time, FIG. 7 illustrates the use of the fingerprint sensor with two leading keys, FIG. 8 illustrates a sensor with a switch for tapping, FIG. 9 illustrates a flow chart of a method, and FIG. 10 illustrates a flow chart of a method.

DESCRIPTION OF EMBODIMENTS

The electronic device may be user equipment, a computer, a camera, a video camera, a video player, a CD or a DVD player, a radio, a television or a vehicle having electronics, like a car, without however being restricted to these.

First the radio system is described by means of FIG. 1. A typical digital radio system comprises subscriber equipment 100 to 104, at least one base station 106 (node B), and a base station controller 108 (radio network controller). The subscriber equipment 100 to 104 communicates with the base station 106 using signals 110 to 114. The base station 106 can be connected to the base station controller 108 by a digital transmission link 116. The subscriber equipment 100 to 104 may be fixedly installed terminals, user equipment installed in a vehicle or portable mobile terminals. The signals 110 to 114 between the subscriber equipment 100 to 104 and the base station 106 carry digitised information, which is e.g. speech or data information produced by subscribers or control information produced by the radio system.

FIG. 2 illustrates a block diagram of an electronic device, which may be subscriber equipment of a cellular radio system. The subscriber equipment may comprise an antenna 200, a transceiver 202, a controller 204, a sensor 206 for detecting characteristics of a user, components 208 to 220 for providing a user perceivable output quantity, a memory 222, a keypad or a keyboard 224 and a microphone 226. The sensor 206 for detecting characteristics of a user may be a fingerprint sensor, a palmprint sensor or the like. In general, the sensor may detect position-dependent properties of skin. The user perceivable output quantity may be provided by at least one of the following: a display 208, a camera 210, a light 212, a loudspeaker 214, a vibrational source 216, a clock 218, a backlight 220, etc. or any combination thereof.

The antenna 200 transmits and receives signals, the destination or source of which is a base station of the radio system. The transmitter of the transceiver 202 may comprise a modulator, which can perform digital signal processing, and radio frequency parts, in which a signal can be multiplied and filtered so as to be transferred to a radio frequency determined by a carrier wave.

The receiver of the transceiver 202, in turn, may transfer a received radio frequency signal to a baseband frequency and a demodulator of the receiver can transform an analog signal of the baseband frequency into a digital signal. The controller 204 may provide digital signal processing needed, typically implemented with a microprocessor, a signal processor or separate components and associated software. The controller 204 may also control the operation of the subscriber equipment.

The fingerprint sensor functioning as a sensor 206 for detecting characteristics of a user can be used to detect a relief of a fingertip. The display 208 can be configured to display graphics and text. The camera 210 can be used to take a digital photo or video. The light 212 can be used as an electric torch and it may include at least one LED (Light Emitting Diode) or another source of optical radiation.

The loudspeaker 214 may be a loudspeaker from which the user hears, for instance, the voice of the other user or any other sound associated with the data stored or received in the subscriber equipment. The microphone 226, in turn, can be an interface used for inputting the voice of the user trans-formed into an electrical form into the electronic device. The clock 218, which may be a part of the display, can be used to show the time for the user.

With the keypad or the keyboard 224 the user can input information to the subscriber equipment in an alphanumeric form. The memory 222 is needed, for instance, for storing the fingerprint of the user or telephone numbers, calendar data and other user-specific data. The backlight 220 is meant to illuminate the display 208 and/or the keypad 224 to allow the user to see their indications also in the dark. The backlight 220 and the light 212 do not need to be separate but can also be combined. The vibrating alert of the vibrational source 216 may be used to arouse the user's attention with or without a ringing tone. The controller 204 may control all the components 202, 206 to 226.

The electronic device is not necessarily subscriber equipment, and hence does not necessarily include the antenna 200 and the transceiver 202. Minimally, the sensor 206 for detecting characteristics of a user, at least one component 208 to 220 for providing a user perceivable output quantity and the controller 204 are needed.

The sensor 206 for detecting characteristics of a user may be a sensor for detecting characteristics of skin, such as a fingerprint sensor. There are various types of sensors for detecting the relief of the fingertip. The sensor may comprise an array or a matrix of pixels as a detector in order to form a digital image of the characterising object. The sensor with an array of pixels can also be called a strip or a sweep sensor because a finger is swept over the strip. The sensor with a matrix of pixels is also known as an area type of sensor or a touch type of sensor because the pixels cover an area corresponding to that of a fingertip. Hence, an image of a fingertip is formed without sweeping.

Optical sensors take an optical image of a fingertip and they may additionally process the image to form an image of the fingerprint with an enhanced contrast between ridges and valleys.

In capacitive sensors, the ridges and valleys of a finger on the sensor change the capacitance between adjacent pixels. By measuring the distribution of the capacitance, an image of the fingerprint can be obtained.

Thermal capacity sensors measure heat emission from a fingertip. Usually a pixel receives more heat from a ridge than from a valley, and by measuring the temperature differences detected by the pixels, an image of the fingerprint can be synthesized.

Electric field radiated from a fingertip can also be measured. An electric field sensor may feed the fingertip with a low-powered signal. The signal progresses through the finger back to the array or the matrix of the pixels of the sensor which measure the attenuation of the signal. Since the ridges have a different attenuation than the valleys, the measured two-dimensional distribution of the attenuation is a representation of the fingerprint. In a similar manner, conductivity of a fingertip can be measured and an image of a fingerprint can be formed.

A pressure-sensitive fingerprint sensor can be used. The sensor may form an image of a fingerprint based on the fact that a ridge exerts more pressure on a sensor than a valley. The two-dimensional distribution of the pressure corresponds to the fingerprint.

Additionally, an image of a fingertip can be formed using an ultrasound sensor.

Images formed in any technique can be recorded and processed similarly in a digital form. In general, any sensor detecting a characterized feature of a user can be used. A characteristic means a characterized feature of a user, which may be a relief of a certain part of skin, and more specifically the skin of a fingertip.

FIG. 3A shows an embodiment of a possible operation for controlling the electronic device 300 having a sensor 206 for detecting characteristics of a user. In this example, the characteristics of the user are read from a fingertip 302. For controlling the scaling of a user perceivable output quantity of the electronic device 300, the fingertip 302 is rotated in either direction around a normal of a surface of a sensor 206. The rotational center is marked with a dot on the fingernail. The initial position of the fingertip 302, when the detector first detects the fingertip 302, is illustrated using a continuous line, and the final position of the fingertip for this adjustment step is illustrated using a dashed line. As the controller 204 includes an image processing program, the controller 204 is capable of detecting the rotational movement of the fingerprint around the normal of the surface of the sensor 206. When detecting the rotational movement, the resolution may be lower than in the actual fingerprint authentication operation which is used to verify a proper user. That speeds up the control. A piece of information on the rotational movement can be input from the sensor 206 to the controller 204. When the rotational movement is detected and the piece of information is input to the controller 204, the scaling of a desired user perceivable output quantity of the electronic device can be controlled by the controller 204 as a function of the rotational movement detected by the sensor 206.

FIG. 3B shows the electronic device 300 from side in order to illustrate the direction of the normal n of the surface of the sensor 206 and the rotation of the finger around it.

The user perceivable output quantity may be a user perceivable acoustic quantity, a user perceivable visual quantity or a user perceivable tactile quantity or the like. The user perceivable visual quantity may be a scene seen in the camera 210 and/or the display 208. The scene may be controlled and the magnification of the camera 210 may be the scaling parameter. Hence, the magnification of the camera 210 is increased or decreased by rotating a finger 302 in either direction on the sensor 206. For instance, by rotating the finger 302 clockwise around the normal of the surface of the sensor 206 may zoom in and rotating the finger 302 counter-clockwise may zoom out. The scaling operation is applied to the scene as a whole. Non-rotational movements of the finger may be used for other purposes and/or adjustments.

In a similar manner, the magnification of the display 208 may be controlled. Thus, for instance, rotating the finger 302 clockwise around the normal of the surface of the sensor 206 may zoom in a document or an image in the display. Rotating the finger 302 counter-clockwise may zoom out the document or the image.

The user perceivable visual quantity may be illumination provided by the backlight 220. The illumination strength, optical band (colour) or contrast may be the scaling parameters. Hence, illumination strength, optical band (colour) or contrast may be controlled by the controller 204. The illumination strength of each RGB (Red, Green, Blue) colour can also be controllable scaling parameters.

The user perceivable visual quantity may also be illumination of the light 212, which may a filament lamp, halogen lamp, gas lamp, light-emitting diode, laser or the like. In a similar manner to the backlight 212, the illumination strength or optical band (colour) may be the scaling parameters. Hence, the illumination strength or the optical band may be controlled by the rotation of a finger. Additionally, the time of a clock may be adjusted by turning a finger on the sensor 206.

The user perceivable acoustic quantity may be sound or voice heard from the loudspeaker 214, or any other sound (such as "click" from depressible buttons or keys). Thus, the scaling may be applied to such user perceivable acoustic quantities as volume of the sound or voice which may be increased or decreased by the controller 204 according to the rotational movement detected by the sensor 206. A parameter of the user perceivable acoustic quantity to be scaled may also be a tone (i.e. frequency or acoustic band) of the sound or voice heard from the loudspeaker 214 which may be tuned by the controller 204 according to the rotation of a finger.

Moreover, the user perceivable tactile quantity may be a vibration of the electronic device. The scaling of the vibration means increasing or decreasing the vibration strength in whole band or at one or more vibrational bands (vibration frequencies) separately. The vibration strength may be changed by the controller 204 according to the rotation of a finger.

FIG. 4 shows another embodiment. In this example, the user perceivable quantity can be controlled by a length of time which is used in receiving the characteristics of a user by the sensor 206. Hence, for example, the longer the user keeps his/her finger on the sensor 206, the more the user perceivable output quantity can be altered.

Consider, for instance, that a zoom of the camera 210 of the electronic device is to be changed. The user puts his/her finger 302 on the sensor 206 for detecting a fingerprint. If the user keeps his/her finger 302 on the sensor 206 for a short while, the magnification of the camera may increase (decrease). If the user keeps his/her finger 302 on the sensor 206 for a longer time, the magnification may decrease (increase) because after the magnification has reached its maximum, the magnification may start smoothly decreasing. This kind of behaviour is shown in FIG. 5. A value of the user perceivable output quantity 500 is in y-axis and time is in x-axis. The scale is arbitrary.

Alternatively, after the maximum magnification, the magnification may suddenly drop to the minimum and start increasing, i.e. the control of the magnification may be cyclic. This kind of behaviour is shown in FIG. 6. A value of the user perceivable output quantity 600 is in y-axis and time is in x-axis, both in an arbitrary scale.

Similarly, for instance, the illumination of the display 208 of the electronic device may be changed. The user puts his/her finger 302 on the sensor 206 for detecting a fingerprint. If the user keeps his/her finger 302 on the sensor 206 for a short while, the illumination may become brighter. If the user keeps his/her finger 302 on the sensor 206 for a longer time, the illumination may become darker because after the illumination has reached its maximum, the illumination may start smoothly decreasing. If the illumination is cyclic, the maximum illumination may suddenly drop to the minimum and start increasing again. The user perceivable output quantity of any component 208 to 220 may be controlled in a corresponding manner.

In an embodiment, the user may select the type of control of a user perceivable quantity. Consider again, for instance, that the illumination of the display 208 of the electronic device is wished to be changed. In this example, the user may press a button or a key 400 to input an input code determining a type of control of the user perceivable quantity. The type of control may include strengthening or weakening the user perceivable quantity, such as acoustic, visual or tactile quantity. That means that the direction of the control (such as illumination up or down) can be determined. When the electronic device has received the input code determining the type of control of a user perceivable quantity and determined the length of time for receiving the characteristics of a user, the controller 204 may control the user perceivable output quantity of the electronic device according to the input code as a function of the length of the time in the receiving the characteristics of a user. The simple code input by depressing the button 400 may determine that the illumination is to be increased and the length of time in the receiving the characteristics of a user may determine how much the illumination is to be increased. If the button 400 is not pressed, it may mean a code for decreasing the illumination as a function of the time the user keeps his/her finger on the sensor. In general, the type of control by an input key of the electronic device may be determined such that one kind of control of the user perceivable output quantity is active without pressing the input key and a different kind of control of the user perceivable output quantity is activated by pressing the key.

FIG. 7 shows an example similar to FIG. 4. The difference in this example is that all types of the control have their own buttons 500, 502. The type of control can be determined by an activation of, for example, a pair of input keys 500, 502 of the electronic device. A first input key 500 may activate one kind of control of the user perceivable output quantity and a second input key 502 may activate a different kind of control of the user perceivable output quantity. Hence, if the user perceivable quantity is to be, for instance, strengthened, a button 500 is pressed. If, in turn, the user perceivable quantity is to be weakened, a button 502 is pressed.

Instead of having at least one button for the input code determining the type of control, the type of control can be determined based on a number of times a button is tapped. In this case, the sensor can be built on a switch 800 as shown in FIG. 8. The sensor 206 can first be tapped to activate the sensor 206 and then the sensor 206 can be used to control the user perceivable quantity. When the sensor 206 is tapped, the sensor 206 moves abruptly in the vertical direction and that makes the switch 800 change its state. The switching of the switch 800 is recognized by the controller 204, which activates the sensor 206.

The controller 204 may also perform context recognition and monitor the user activity. When a context in the electronic device is detected, the user perceivable output quantity to be controlled can be selected according to the context. For example, if the electronic device is subscriber equipment and the user selects the use of the camera of the electronic device, the controller may detect the context: use of camera. Based on this recognition, the controller may select visual output quantity for the sensor 206 to be controlled. For instance, the sensor 206 may be used to control the zoom operation of the camera (and the display). In a similar manner, the user may be listening to radio or some recording with his/her mobile phone when his/her mobile phone rings. The user may listen to the voice of the person who calls him and the radio or the recording at the same time, but the user may turn downwards the volume of the radio or the recording by rotating his/her finger on the fingerprint sensor.

The turning angle of the characteristic part of the user on the sensor may determine the change in the scaling of the user perceivable output quantity. The coordinate system to determine the angle may be relative or fixed with respect to the structure of the sensor.

In the case of a relative coordinate system, an initial position of the characteristic part of the user is first detected and the initial position can be considered the origin at the beginning of each adjustment. Hence, the origin is variable or relative. As long as the characteristic part of the user is in contact with the sensor, the angle is measured and the user perceivable output quantity is controlled as a function of the rotation (i.e. angle) of the characteristic part of the user.

In the case of a fixed coordinate system, a predetermined position of the characteristic part of the user in relation to the structure of the sensor is considered the origin of the rotation. If the characteristic part of the user is put on the sensor in a position different from the origin, the sensor may detect the angle between the origin and the observed position. Hence, in this solution the initial position does not each time determine a new origin, but the origin is fixed or constant. However, changing the strength of the user perceivable output quantity still depends on the detected rotation of the characteristic part of the user on the sensor.

FIG. 9 shows a flow chart of a method of controlling an electronic device having a sensor for detecting characteristics of a user. In step 900, rotational movement of the characteristics of a user around a normal of a surface of a sensor detecting characteristics of user is detected. In step 902, the scaling of a user perceivable output quantity of the electronic device is controlled as a function of the rotational movement detected by the sensor.

FIG. 10 shows a flow chart of another method of controlling an electronic device having a sensor for detecting characteristics of a user. In step 1000, a sensor for detecting characteristics of a user receives characteristics of a user. In step 1002, a length of time relating to receiving the characteristics of a user is determined. In step 1004, the scaling of the user perceivable output quantity of the electronic device is controlled as a function of the length of the time relating to receiving the characteristics of the user.

The implementation of the solution described in the application can be accomplished, for example, by means of specific equipment providing the required operations, such as an application-specific integrated circuit (ASIC), or separate logic components. The implementation may also be accomplished, for example, by means of software, the controller 204 comprising enough memory and a microprocessor, where the operations of the method described above are carried out in the form of software.

In the case of a software solution, a computer program product may en-code a computer program of instructions for executing a computer process for controlling an electronic device having a sensor for detecting characteristics of a user according to the methods described in FIGS. 9 and 10.

A computer program can be distributed in a distribution medium readable by a computer. The computer program of instructions can be encoded for executing the computer process for executing a computer process for controlling an electronic device having a sensor for detecting characteristics of a user according to the methods described in FIGS. 9 and 10.

The distribution medium may comprise a computer readable medium, a program storage medium, a record medium, a computer readable memory, a computer readable software distribution package, a computer readable signal, a computer readable telecommunications signal, a computer readable compressed software package or any combination thereof.

Even though the invention is described above with reference to an example according to the accompanying drawings, it is clear that the invention is not restricted thereto but it can be modified in several ways within the scope of the appended claims.

What is claimed is:

1. In an electronic device having a sensor for detecting characteristics of a user skin and, functionally separate from the sensor, a user interface component for receiving user input, a method comprising:
    detecting pivoting movement of the characteristics of the user skin around a pivot point on a surface of a sensor detecting characteristics of the user skin;
    controlling scaling of a user perceivable output quantity of the electronic device as a function of the pivoting movement detected by the sensor;
    detecting context in the electronic device;
    receiving from the user interface component an input determining a type of control of the user perceivable output quantity of the electronic device;
    determining the type of control as strengthening or weakening at least one of the following: a user perceivable acoustic quantity, a user perceivable visual quantity, or a user perceivable tactile quantity;
    changing the user perceivable output quantity to be controlled by selecting the user perceivable output quantity to be controlled according to the context so that the controlling controls a zoom operation in the electronic device; and
    additionally changing the user perceivable output quantity to be controlled by selecting the user perceivable output quantity to be controlled according to the input.

2. The method of claim 1, the method further comprising performing detecting rotational movement of the characteristics of the user skin by detecting rotational movement of a fingerprint of a user around the normal of the surface of the sensor.

3. The method of claim 1, the method further comprising determining the type of control by an activation of either of a pair of input keys of the electronic device, a first input key activating one kind of control of the user perceivable output quantity and a second input key activating a different kind of control of the user perceivable output quantity.

4. The method of claim 1, the method further comprising determining the type of control by an input key of the electronic device, one kind of control of the user perceivable output quantity being active without pressing the input key and a different kind of control of the user perceivable output quantity being activated by pressing the key.

5. The method of claim 1, the method further comprising receiving by the sensor for detecting characteristics of the user skin an activation signal for performing controlling the user perceivable output quantity, the sensor for detecting characteristics of the user being configured to be tapped by the user for activation.

6. The method of claim 1, further comprising selecting the user perceivable output quantity to be controlled according to the context so that the controlling controls a zoom operation of a display of the electronic device.

7. The method of claim 1, further comprising selecting the user perceivable output quantity to be controlled according to the context so that the controlling controls a zoom operation of a camera of the electronic device.

8. The method of claim 1, further comprising selecting the user perceivable output quantity to be controlled according to the context so that the controlling controls a zoom operation of a camera and a display when the user selects using of the camera of the electronic device.

9. An electronic device including
    a sensor for detecting characteristics of a user skin,
    a user interface component configured to receive user input, the user interface component being functionally separate from the sensor,
    at least one component configured to output a user perceivable output quantity, and
    a controller configured to receive detection information from the sensor and to control the at least one component wherein
    the sensor is configured to detect pivoting movement of the characteristics of the user skin around a pivot point on a surface of the sensor; and the controller is configured to:
control scaling of the user perceivable output quantity of the at least one component as a function of the pivoting movement detected by the sensor;
detect a context in the electronic device;
receive, from the user interface component, an input determining a type of control of the user perceivable output quantity;
determine the type of control as strengthening or weakening at least one of the following:
a user perceivable acoustic quantity, a user perceivable visual quantity, or a user perceivable tactile quantity;
change the user perceivable output quantity to be controlled by selecting the user perceivable output quantity to be controlled according to the context so that the controlling controls a zoom operation in the electronic device; and
additionally change the user perceivable output quantity to be controlled by selecting the user perceivable output quantity to be controlled according to the input.

10. The electronic device of claim 9, wherein the sensor is a fingerprint sensor configured to detect rotational movement of a fingerprint of a user around the normal of the surface of the sensor.

11. The electronic device of claim 9, wherein the electronic device includes at least one input key for receiving the input, the key being configured to be pressed by the user.

12. The electronic device of claim 11, wherein the electronic device includes a pair of input keys for determining the type of control by an activation of either of the input keys, a first input key is configured to activate one kind of control of the user perceivable output quantity and a second input key is configured to activate a different kind of control of the user perceivable output quantity.

13. The electronic device of claim 11, wherein the electronic device includes an input key for determining the type of control, the input key is configured to activate one kind of control of the user perceivable output quantity and a different kind of control of the user perceivable output quantity is active without pressing the input key.

14. The electronic device of claim 11, wherein the electronic device includes a switch for receiving an activation signal for performing controlling the user perceivable output quantity, the sensor for detecting characteristics of the user skin being configured to be tapped by the user for activation.

15. Subscriber equipment of a radio system including
a sensor for detecting characteristics of a user skin,
a user interface component configured to receive user input, the user interface component being functionally separate from the sensor,
at least one component configured to output a user perceivable output quantity, and
a controller configured to receive detection information from the sensor and to control the at least one component, wherein
the sensor is configured to detect pivoting movement of the characteristics of the user skin around a pivot point on a surface of the sensor, and
the controller is configured to:
control scaling of the user perceivable output quantity of the at least one component as a function of the pivoting movement detected by the sensor;
detect a context in the electronic device;
receive, from the user interface component, an input determining a type of control of the user perceivable output quantity;
determine the type of control as strengthening or weakening at least one of the following:
a user perceivable acoustic quantity, a user perceivable visual quantity, or a user perceivable tactile quantity;
change the user perceivable output quantity to be controlled by selecting the user perceivable output quantity to be controlled according to the context so that the controlling controls a zoom operation in the electronic device; and
additionally change the user perceivable output quantity to be controlled by selecting the user perceivable output quantity to be controlled according to the input.

16. An electronic device including
sensing means for detecting characteristics of a user skin,
a user interface means for receiving user input, the user interface means being functionally separate from the sensing means,
at least one output means for outputting a user perceivable output quantity, and controlling means for receiving detection information from the sensing means and for controlling the at least one output means, wherein
the sensing means is configured to detect pivoting movement of the characteristics of the user skin around a pivot point on a surface of the sensing means; and
the controlling means is configured to:
control scaling of the user perceivable output quantity of the at least one output means as a function of the pivoting movement detected by the sensing means;
detect a context in the electronic device;
receive, from the user interface means, an input determining a type of control of the user perceivable output quantity;
determine the type of control as strengthening or weakening at least one of the following:
a user perceivable acoustic quantity, a user perceivable visual quantity, or a user perceivable tactile quantity;
change the user perceivable output quantity to be controlled by selecting the user perceivable output quantity to be controlled according to the context so that the controlling controls a zoom operation in the electronic device, and
additionally change the user perceivable output quantity to be controlled by selecting the user perceivable output quantity to be controlled according to the input.

17. A computer program embodied on a non-transitory computer readable medium comprising computer executable program code which, when executed by at least one controller of an electronic device having a sensor for detecting characteristics of a user skin, causes the electronic device to:
detect pivoting movement of the characteristics of the user skin around a pivoting point on a surface of a sensor detecting characteristics of the user skin;
control scaling of a user perceivable output quantity of the electronic device as a function of the pivoting movement detected by the sensor;
detect a context in the electronic device;
receive, from a user interface component functionally separate from the sensor, an input determining a type of control of the user perceivable output quantity;
determine the type of control as strengthening or weakening at least one of the following:
a user perceivable acoustic quantity, a user perceivable visual quantity, or a user perceivable tactile quantity;
change the user perceivable output quantity to be controlled by selecting the user perceivable output quantity to be controlled according to the context so that the controlling controls a zoom operation in the electronic device, and additionally change the user perceivable output quantity to be controlled by selecting the user perceivable output quantity to be controlled according to the input.

* * * * *